US012783945B2

(12) United States Patent
Yang et al.

(10) Patent No.: US 12,783,945 B2
(45) Date of Patent: Nov. 3, 2026

(54) MODEL PARAMETER ADJUSTING METHOD AND DEVICE, STORAGE MEDIUM AND PROGRAM PRODUCT

(71) Applicant: BAIDU ONLINE NETWORK TECHNOLOGY (BEIJING) CO., LTD., Beijing (CN)

(72) Inventors: Qingyou Yang, Beijing (CN); Kai He, Beijing (CN); Jinghua Jiang, Beijing (CN); Jue Hong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 909 days.

(21) Appl. No.: 18/181,032

(22) Filed: Mar. 9, 2023

(65) Prior Publication Data

US 2023/0206133 A1 Jun. 29, 2023

Related U.S. Application Data

(63) Continuation of application No. PCT/CN2021/105839, filed on Jul. 12, 2021.

(30) Foreign Application Priority Data

Jan. 22, 2021 (CN) ........................ 202110088699.1

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2018/0114028 A1* 4/2018 Kafai .................... H04L 9/3239
2019/0378210 A1* 12/2019 Merrill ..................... G06N 5/01
(Continued)

FOREIGN PATENT DOCUMENTS

CN 106055891 A 10/2016
CN 109412786 A 3/2019
(Continued)

OTHER PUBLICATIONS

Mishina, Ibuki et al. CN 114245917 Secret Normalization Index Function Calculating System, Secret Normalization Index Function Calculating Method, A Secret Neural Network Calculating System, A Secret Neural Network Learning System, Program, English Translation, Filed Aug. 14, 2019. (Year: 2019).*
(Continued)

*Primary Examiner* — Barbara M Level
(74) *Attorney, Agent, or Firm* — Tucker Ellis LLP

(57) ABSTRACT

Disclosed are a model parameter adjusting method and device, a storage medium and a program product. The method includes: performing classification processing on input data by using a classification model obtained through training based on secure multi-party computing, to obtain classification prediction values of the classification model (S201); performing reduction processing on the classification prediction values (S202); performing normalization processing on the classification prediction values subjected to the reduction processing, to obtain a normalization result of the classification prediction values (S203); and updating a parameter of the classification model according to the normalization result of the classification prediction values (S204). Input values for a normalization method are reduced by means of performing the reduction processing on the classification prediction values, such that generation of data overflow can be avoided in a normalization process, thus the (Continued)

training precision of the classification model can be improved.

20 Claims, 8 Drawing Sheets

(56) References Cited

U.S. PATENT DOCUMENTS

| | | | | |
|---|---|---|---|---|
| 2020/0036510 | A1* | 1/2020 | Gomez | G06N 3/08 |
| 2020/0164517 | A1* | 5/2020 | Dick | B25J 9/1682 |
| 2020/0226470 | A1 | 7/2020 | Storm et al. | |
| 2020/0250542 | A1 | 8/2020 | Li et al. | |
| 2021/0279635 | A1* | 9/2021 | Gadelrab | G06N 3/063 |

FOREIGN PATENT DOCUMENTS

| | | |
|---|---|---|
| CN | 110890985 A | 3/2020 |
| CN | 111537945 A | 8/2020 |
| CN | 111798047 A | 10/2020 |
| CN | 112818387 A | 5/2021 |

OTHER PUBLICATIONS

Sharma, Shantanu et al. WO 2023/132791 A2, Priority Jan. 4, 2022, Method and System for Variable On-Demand Privacy-Preserving Federated Learning Using Multiparty Computation 2022. (Year: 2022).*

Jing, Xiao-dong CN 119094101A, Data Analysis Method and Device Based on Multi-party Security Calculation, English Translation , Filed Sep. 4, 2024. (Year: 2024).*

Waller, Adrian et al. GB 2594453 A, Methods and Systems for Training a Machine Learning Model, English Translation, filed Apr. 24, 2020. (Year: 2020).*

Weng, Shu-feng et al, CN119721139, Data Processing Device, Method, and Neural Network, filed Sep. 26, 2023 (Year: 2023).*

Office Action of corresponding Chinese Application No. 202110088699.1, dated Jul. 26, 2023, 9 pages.

Supplementary European Search Report of corresponding European Application No. 21920540.8, dated Jul. 9, 2024, 8 pages.

International Search Report of corresponding International Application No. PCT/CN2021/105839, dated Oct. 20, 2021, 15 pages.

* cited by examiner

Algorithm 1: plaintext long division algorithm

```
Input: input: a dividend x, a divisor y
Output: x/y
let the quotient q=0
aligning the most significant bits of
the divisor and the dividend
repeat
    if the dividend is not smaller than the divisor then
        adding 1 to the right of q;
        the dividend x=x-y;
        shifting the divisor y to the right by one bit;
    else
        adding 0 to the right of q;
        shifting the dividend x to the left by one bit;
    end
until a number of bits of the quotient q is equal
to a preset length of significant bits
Result: q
```

FIG. 5

MODEL PARAMETER ADJUSTING METHOD AND DEVICE, STORAGE MEDIUM AND PROGRAM PRODUCT

This application is a continuation of International Application No. PCT/CN2021/105839, filed on Jul. 12, 2021, which claims priority to Chinese Patent Application No. 202110088699.1, filed on Jan. 22, 2021, both of which are hereby incorporated by reference in their entireties.

TECHNICAL FIELD

The present disclosure relates to the field of secure multi-party computing such as multi-party machine learning, federated learning, joint modeling or the like, and particularly to a model parameter adjusting method and device, a storage medium and a program product.

BACKGROUND

In machine learning based on secure multi-party computing (MPC or SMC), secure multi-party computing technology is often used to protect data privacy for each participant in the machine learning.

In a process of training a classification model based on secure multi-party computing, when using a softmax function to normalize a classification prediction value of a current classification model, an exponential operation on the classification prediction value may produce a very large numerical value that is prone to exceed a data representation range of the secure multi-party computing, and incur the problem of data overflow, thereby resulting in a classification model, which is obtained through training, with declined precision, or even unusable due to abnormal precision.

SUMMARY

The present disclosure provides a model parameter adjusting method, an electronic device and a storage medium.

According to a first aspect of the present disclosure, provided is a model parameter adjusting method, including:

- performing classification processing on input data by using a classification model obtained through training based on secure multi-party computing, to obtain classification prediction values of the classification model;
- performing reduction processing on the classification prediction values;
- performing normalization processing on the classification prediction values subjected to the reduction processing to obtain a normalization result of the classification prediction values; and
- updating a parameter of the classification model according to the normalization result of the classification prediction values.

According to a second aspect of the present disclosure, provided is an electronic device, including:

- at least one processor, and
- a memory communicatively connected with the at least one processor;
- where the memory has stored thereon instructions executable by the at least one processor, and the instructions, when executed by the at least one processor, enable the at least one processor to implement the method according to the first aspect.

According to a third aspect of the present disclosure, provided is a non-transitory computer-readable storage medium on which computer instructions are stored, where the computer instructions are configured to enable the computer to execute the method according to the first aspect.

BRIEF DESCRIPTION OF DRAWINGS

The drawings are intended to better understand the present solution and do not constitute a limitation to the present disclosure. Among them:

FIG. 5 is a schematic flowchart of plaintext long division according to the second embodiment of the present disclosure;

DESCRIPTION OF EMBODIMENTS

The technique according to the present disclosure improves the precision of a classification model obtained through training based on secure multi-party computing.

It should be understood that the content described in this section is neither intended to identify key or important features of embodiments of the present disclosure, nor is used to limit the scope of the present disclosure. Other features of the present disclosure will become readily comprehensible through the following description.

Exemplary embodiments of the present disclosure are explained hereunder in conjunction with the accompanying drawings, including various details of embodiments of the present disclosure helpful to understanding, which should be considered as being only exemplary. Therefore, those of ordinary skill in the art should recognize that various changes and modifications can be made to the embodiments described herein without departing from the scope and spirit of the present disclosure. Similarly, for clarity and conciseness, descriptions on well-known functions and structures are omitted from the following description.

The present disclosure provides a model parameter adjusting method and device, a storage medium and a program product to be used in the field of secure multi-party computing such as multi-party machine learning, federated learning, joint modeling or the like, so as to improve the precision of a classification model obtained through training based on secure multi-party computing.

Figure 1:
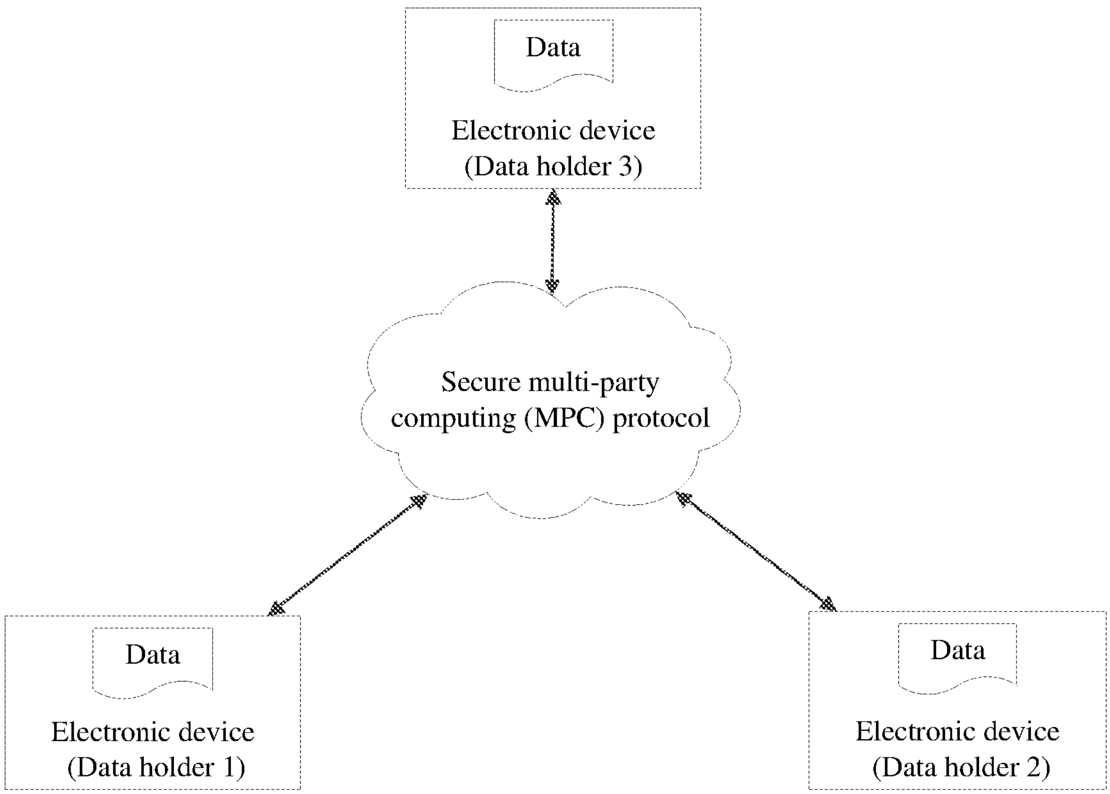
FIG. 1 is a schematic diagram of a machine learning framework based on secure multi-party computing according to an embodiment of the present disclosure.

The model parameter adjusting method according to embodiments may be applied to the machine learning framework based on secure multi-party computing as shown in FIG. 1. As shown in FIG. 1, in the machine learning framework based on the secure multi-party computing, a plurality of data holders (3 data holders, namely, data holder 1, data holder 2 and data holder 3, are illustrated in FIG. 1 as an example) jointly trains a classification model based on a secure multi-party computing (MPC) protocol according to private data they hold, and the private data of any one of the parties will not be learned by the other two parties, thereby improving the value of data utilization while taking account of the security of their own private data.

In a joint training process of a classification model based on secure multi-party computing, a softmax function is used to normalize a classification prediction value of a current classification model, where an exponential operation on the classification prediction value may produce a very large numerical value that is prone to exceed a data representation range of the secure multi-party computing and incur the problem of data overflow, thereby resulting in a classification model, which is obtained through training, with declined precision, or even unusable due to abnormal precision.

The model parameter adjusting method according to the embodiments prevents data overflow in normalization processing based on secure multi-party computing, thus improving the precision of a classification model obtained through training based on the secure multi-party computing.

It should be noted that the related data processing in the model parameter adjusting method according to the present disclosure is data processing based on secure multi-party computing. Unless otherwise specified, all the related data is ciphertext data, and the processing performed is processing based on the ciphertext.

Figure 2:
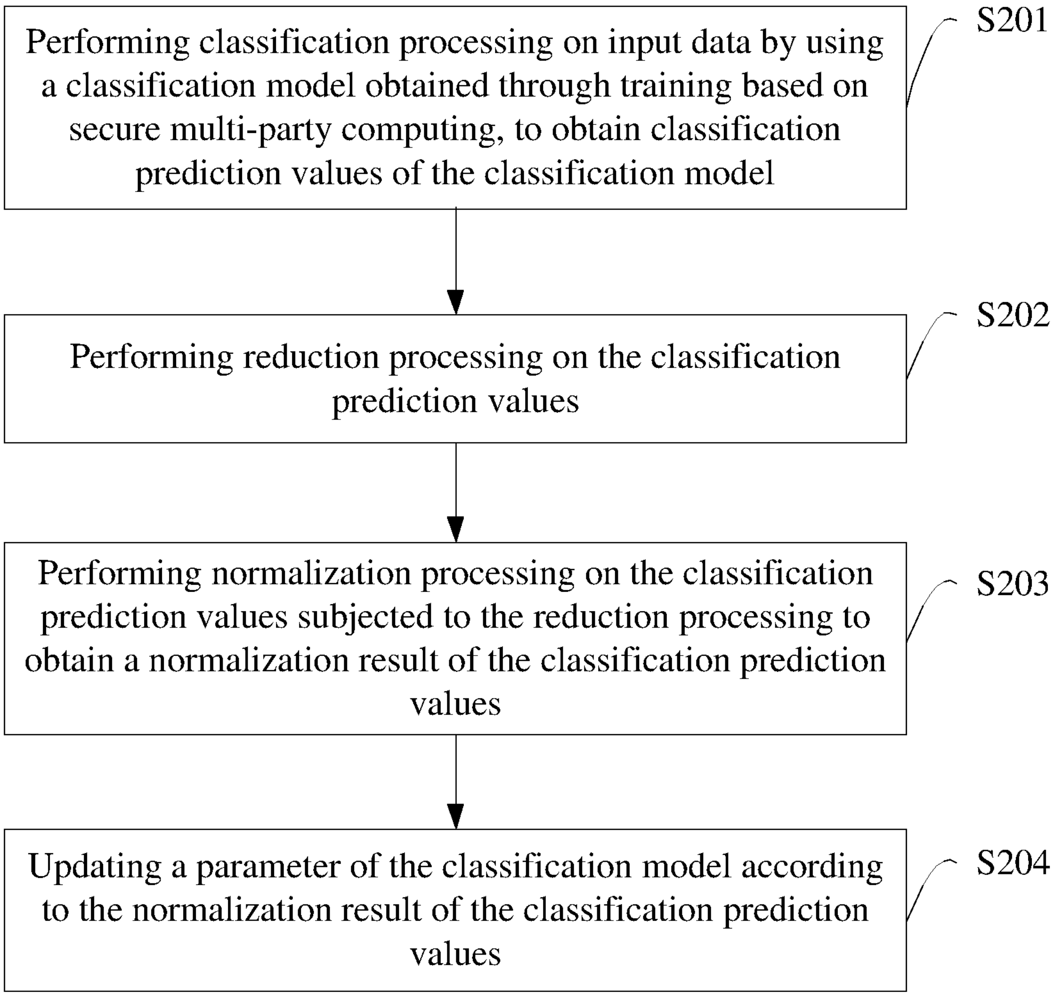
FIG. 2 is a flowchart of a model parameter adjusting method according to a first embodiment of the present disclosure.

FIG. 2 is a flowchart of a model parameter adjusting method according to a first embodiment of the present disclosure. As shown in FIG. 2, the specific steps of the method are as follows.

Step S201, performing classification processing on input data by using a classification model obtained through training based on secure multi-party computing to obtain classification prediction values of the classification model.

The classification prediction values of the classification model include a prediction value corresponding to a respective classification of the classification model.

In a training process of the classification model based on secure multi-party computing, a current classification model obtained through training based on secure multi-party computing is used to perform classification processing on input data so as to obtain classification prediction values of the current classification model.

In the embodiment, the input data, which may be data from a train set or a test set, may be data of various types such as image, text, voice or the like, which is not specifically limited in the embodiment.

In data processing based on secure multi-party computing, generally, ciphertext is represented by integers. For a float point data type, it is represented by fixed-point numbers and magnified to be represented by integers. Therefore, in the secure multi-party computing, an actual data representation range is limited.

Step S202, performing reduction processing on the classification prediction values.

In data processing based on secure multi-party computing, a method (softmax) for performing normalization processing on multiple input values $x_0, x_1, \ldots x_1 \ldots, x_k$ is defined as:

$$softmax(x_i) = \frac{\exp(x_i)}{\sum_{i=0}^{k} \exp(x_i)},$$

where $softmax(x_i)$ represents a normalization result of the input value $x_i$, k is the number of the input values and k is a positive integer greater than 1, $\exp(x_i)$ represents an exponential operation on the input value $x_i$. In the softmax method based on the secure multi-party computing, exponential operations increase exponentially with respect to input values, data exceeding a data length that the MPC can process is prone to be produced from the exponential operations and their accumulations, thus incurring data overflow.

In the embodiment, to avoid data overflow resulting from a too large exponential operation result, and data overflow in a process of normalization processing on the classification prediction values based on secure multi-party computing, the classification prediction values are firstly subjected to reduction processing to be reduced into relatively small numerical values which will not exceed a data range that the MPC can process even after an exponential operation.

For example, it is possible to subtract a set value from a classification prediction value. The set value can be set and adjusted according to the data range that MPC can process and a range of the classification prediction values in a specific application scenario, which is not specifically limited in the embodiment.

For example, it is also possible to divide a classification prediction value by a relatively large value. For example, a respective classification prediction value is divided by a maximum value of all of the classification prediction values, such that the classification prediction values are reduced into a range of [0, 1], and a result obtained from an exponential operation on the reduced classification prediction values will still be within the range of [0, 1].

Step S203, performing normalization processing on the classification prediction values subjected to the reduction processing to obtain a normalization result of the classification prediction values.

By means of performing normalization processing on the classification prediction values subjected to the reduction processing, data overflow in a process of normalization is prevented such that a correct normalization result of the classification prediction values is obtained.

Step S204, updating a parameter of the classification model according to the normalization result of the classification prediction values.

After the normalization result of the classification prediction values is obtained, with the normalization result of the classification prediction values serving as predictive probability values of corresponding classifications, it is possible to determine, according to a predictive probability value of a respective classification, a classification result of the classification model, and update a parameter of a current classification model according to the classification result, thereby the training of the classification model is realized, and the training precision of the classification model is improved.

According to the embodiment of the present disclosure, in a process of model parameter adjustment based on secure multi-party computing, perform classification processing on input data by using a classification model obtained through training based on secure multi-party computing to obtain classification prediction values of the classification model; perform reduction processing on the classification prediction values; perform normalization processing on the classification prediction values subjected to the reduction processing to obtain a normalization result of the classification prediction values; and update a parameter of the classification model according to the normalization result of the classification prediction values. By means of performing reduction processing on classification prediction values to reduce input values of a normalization method, generation of data overflow can be avoided in a normalization process, thus the training precision of the classification model can be improved.

Figure 3:
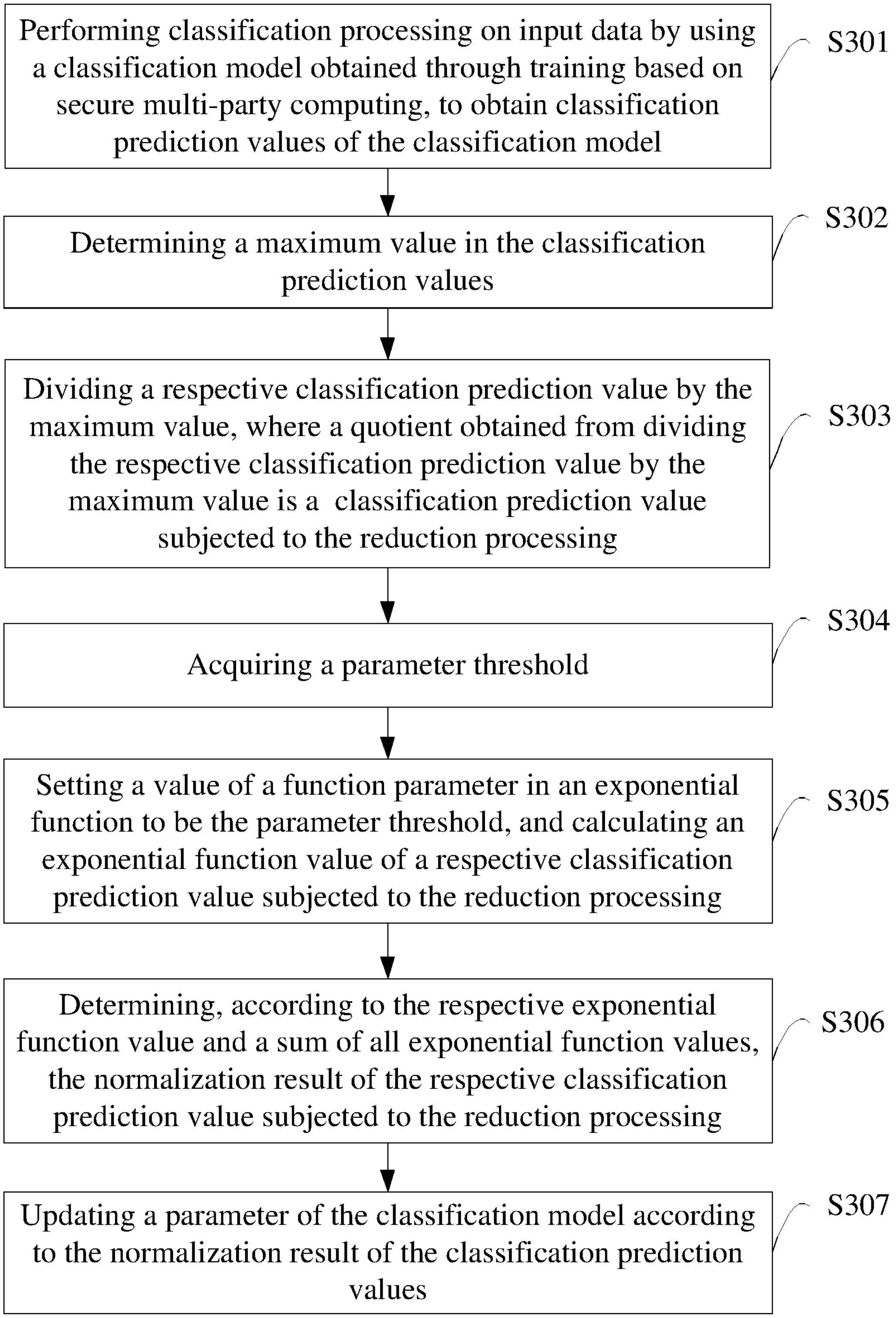
FIG. 3 is a flowchart of a model parameter adjusting method according to a second embodiment of the present disclosure.

FIG. 3 is a flowchart of a model parameter adjusting method according to a second embodiment of the present disclosure. On the basis of the first embodiment, in this embodiment, the reduction processing is performed on the classification prediction values by means of determining a maximum value in the classification prediction values, and dividing a respective classification prediction value by the maximum value. Further, by dividing the respective classification prediction value by the maximum value, it is possible to calculate, through long division based on secure multi-party computing, a quotient of the respective classification prediction value by the maximum value. As shown in FIG. 3, the specific steps of the method are as follows.

Step S301, performing classification processing on input data by using a classification model obtained through training based on secure multi-party computing to obtain classification prediction values of the classification model.

The classification prediction values of the classification model include a prediction value corresponding to a respective classification of the classification model.

In a training process of the classification model based on secure multi-party computing, a current classification model obtained through training based on secure multi-party computing is used to perform classification processing on input data to obtain classification prediction values of the current classification model.

In the embodiment, the input data, which may be data from a train set or a test set, may be data of various types such as image, text, voice or the like, which is not specifically limited in the embodiment.

In data processing based on secure multi-party computing, generally, ciphertext is represented by integers. For a float point data type, it is represented by fixed-point numbers and magnified to be represented by integers. Therefore, in secure multi-party computing, an actual data representation range is limited. In the softmax method based on the secure multi-party computing, the classification prediction values of the classification model are input values of exponential operations. It may easily incur that an exponential operation result exceeds a data length that MPC can process, when an input value is too large, thus incurring data overflow.

In the embodiment, through the following steps S302-S303, each of the classification prediction values is divided by a maximum value of all the classification prediction values, such that the classification prediction values are reduced into a range of [0, 1], and a result obtained from an exponential operation on the reduced classification prediction values will still be within the range of [0, 1], thereby generation of data overflow can be avoided in a process of normalization.

Currently, secure multi-party computing protocols can generally implement basic arithmetic operations such as addition, subtraction, multiplication, comparison and the like, and Boolean operations such as AND, OR, NOT, XOR and the like. For example, common secure multi-party computing protocols include ABY protocol, ABY3 protocol etc. The related arithmetic operations and Boolean operations in the present disclosure all are operations based on secure multi-party computing protocols, which can be implemented using Boolean Circuits or Garbled Circuits based on the basic arithmetic operations and Boolean operations in the secure multi-party computing protocols.

Step S302, determining a maximum value in the classification prediction values.

In the embodiment, calculating a maximum value in two classification prediction values may be represented as c=max{a, b}, which may be realized by calculating c=(a>b)*a+(1−(a>b))*b, where a and b represent the two classification prediction values, and c represents the maximum value in a and b.

Further, determining a maximum value in multiple classification prediction values may be realized based on a method of calculating a maximum value in two classification prediction values.

For example, for k classification prediction values $x_0$, $x_1, \ldots x_i \ldots, x_k$, calculate a maximum value $c_1$ in $x_0$ and $x_1$, calculate a maximum value $c_2$ in $c_1$ and $x_2$, calculate a maximum value $c_3$ in $c_2$ and $x_3$, and so forth until a maximum value $c_k$ in $c_{k-1}$ and $x_k$ is calculated. The final maximum value $c_k$ is the maximum value in the k classification prediction values $x_0, x_1, \ldots x_i \ldots, x_k$.

For example, for the k classification prediction values $x_0$, $x_1, \ldots x_i \ldots, x_k$, it is possible to group the k classification prediction values in pairs, and calculate a maximum value in two classification prediction values of each of the groups, respectively; and calculate, using a similar method, a maximum value in the maximum values of the groups.

Furthermore, based on the method of calculating a maximum value in two classification prediction values, other implementations may be used to determine the maximum value in the multiple classification prediction values, which is not specifically limited in the embodiment.

Step S303, dividing a respective classification prediction value by the maximum value, where a quotient obtained from dividing the respective classification prediction value by the maximum value is a classification prediction value subjected to the reduction processing.

After the maximum value of all of the classification prediction values is determined, the reduction processing is performed on the respective classification prediction value by means of dividing the respective classification prediction value by the maximum value, where the quotient obtained from dividing the respective classification prediction value by the maximum value is a classification prediction value subjected to the reduction processing. In this way, the classification prediction values can be reduced into a range of (0, 1], and a result obtained from an exponential operation on the reduced classification prediction values will still be within the range of (0, 1], thereby it is possible to avoid the problem that data overflow will be generated in a process of normalization due to a too large input value.

Step S304, acquiring a parameter threshold.

An exponential function is defined as:

$$e^x = \lim_{n \to \infty} \left(1 + \frac{x}{n}\right)^n,$$

where n is the parameter of the exponential function, x is a variable for an exponential operation, and $e^x$ is the exponential function value of x.

In an prior art, to avoid data overflow resulting from a too large exponential operation result, a rectified linear unit (ReLU) is commonly used for approximate calculation. However, an error of approximate calculation with the ReLU function is relatively large.

In the embodiment, based on the definition of the exponential function, the parameter in the exponential function is set to be a relatively large parameter threshold as an approximation of infinity, such that an exponential operation is converted into multiplication operations; an approximate exponential operation is realized by means of multiplication operations based on secure multi-party computing, producing a very small error under a relatively large parameter threshold.

The parameter threshold can be set and adjusted according to an actual application scenario, which is not specifically limited in the embodiment.

Step S305, setting a value of a function parameter n in an exponential function to be the parameter threshold and calculating an exponential function value of a respective classification prediction value subjected to the reduction processing.

After the parameter threshold of the exponential function parameter is obtained, set the value of the function parameter n in the exponential function to be the parameter threshold, and calculate the exponential function value of the respective classification prediction value subjected to the reduction processing. In this way, an exponential operation may be converted into multiplication operations; an approximate exponential operation is realized by means of multiplication operations based on secure multi-party computing, producing a very small error under a relatively large parameter threshold, and incurring no data overflow.

Specifically, for the respective classification prediction value subjected to the reduction processing, calculate approximately the exponential function value of the classification prediction value subjected to the reduction processing, through the following Equation 1:

$$e^x = \left(1 + x \times \frac{1}{M}\right)^M \qquad \text{Equation 1}$$

where e is a natural constant, x is the classification prediction value subjected to the reduction processing, $e^x$ is the exponential function value of the classification prediction value subjected to the reduction processing, M is the parameter threshold, $$\frac{1}{M}$$

is the reciprocal of the parameter threshold, and M is a constant.

Step S306, determining, according to the respective exponential function value and a sum of all exponential function values, the normalization result of the respective classification prediction value subjected to the reduction processing.

In this step, a calculation is made by dividing the exponential function value of the respective classification prediction value subjected to the reduction processing by the sum of all the exponential function values, to thereby obtain the normalization result of the respective classification prediction value subjected to the reduction processing, namely, the normalization result corresponding to the classification prediction value.

Combining the foregoing steps S302-S306, in the embodiment, for k classification prediction values $x_0$, $x_1, \ldots x_i \ldots, x_k$, the following Equation 2 may be used to calculate the normalization result of the respective classification prediction value:

$$softmax(x_i) = \frac{\exp(x_i/x_{max})}{\sum_{i=0}^{k} \exp(x_i/x_{max})} \qquad \text{Equation 2}$$

where $\mathrm{softmax}(x_i)$ represents the normalization result corresponding to the classification prediction value $x_i$, $x_{max}$ is the maximum value in $x_0, x_1, \ldots x_i \ldots, x_k$, and $\exp(x_i/x_{max})$ is the exponential function value of $x_i/x_{max}$.

Step S307, updating a parameter of the classification model according to the normalization result of the classification prediction values.

In secure multi-party computing, after the normalization result of the classification prediction values is obtained, it is possible to update, according to the normalization result of the classification prediction values, the parameter of the classification model to perform training on the classification model.

Specifically, it is possible to determine a classification result of the classification model according to the normalization result of the classification prediction values, and update a parameter of the classification model according to the classification result, thereby realizing the training on the classification model, and improving the precision of the classification model.

For example, after the normalization result of the classification prediction values is obtained, taking the normalization result of the classification prediction values as predictive probability values of corresponding classifications, it is possible to determine, according to a predictive probability value of a respective classification, a classification result of the classification model.

In the embodiment, based on the definition of the exponential function, the value of the function parameter n in the exponential function is set to be the parameter threshold, such that an exponential operation is converted into multiplication operations; an approximate exponential operation is realized by means of multiplication operations based on secure multi-party computing, producing a very small error under a relatively large parameter threshold and incurring no data overflow.

In a process of data processing based on secure multi-party computing, Newton's method is commonly used to calculate division. The method, which requires that an initial value of an algorithm parameter should be set to be in association with a range of a dividend and divisor that are input, has certain restrictions on a data length. However, in machine learning of large-scale data, a range of an intermediate result is unpredictable. Therefore, when the intermediate result is used as input data for division, it is difficult to set a proper initial value for correct calculation, which is prone to incur overflow in a division operation.

Figure 4:
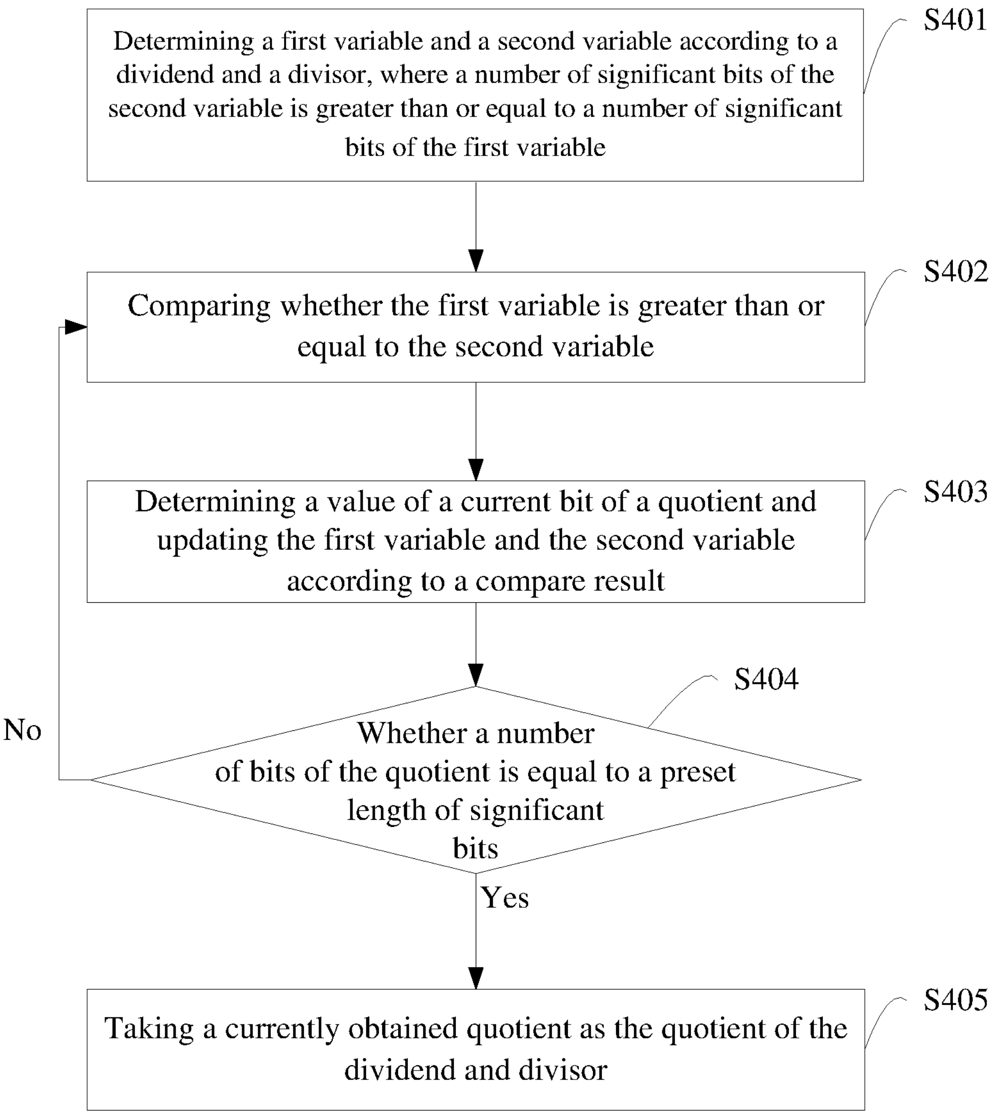
FIG. 4 is a flowchart of long division based on secure multi-party computing according to the second embodiment of the present disclosure.

In an implementation, as shown in FIG. 4, a related division operation based on secure multi-party computing in the present disclosure is implemented by implementing long division based on secure multi-party computing, which can be specifically implemented through the following steps.

Step S401, determining a first variable and a second variable according to a dividend and a divisor, where a number of significant bits of the second variable is greater than or equal to a number of significant bits of the first variable.

FIG. 5 shows an implementation of plaintext long division. In the plaintext long division, before iteration (the processing procedure corresponding to items 3-12 as shown in FIG. 5), the processing as shown in item 2 is required, namely, aligning a most significant bit of a dividend to that of a divisor. It is required that, after the alignment, a number of significant bits of the divisor is greater than or equal to a number of significant bits of the dividend. However, in division based on secure multi-party computing, the most significant bit of the dividend and that of the divisor cannot be directly aligned since the dividend and the divisor are both ciphertext.

In an implementation, it is possible to increase the number of significant bits of the divisor, to thereby obtain the second variable; and take the dividend as the first variable directly. In this way, increasing the number of significant bits of the divisor makes the number of significant bits of the divisor be greater than or equal to the number of significant bits of the dividend, thereby realizing the alignment operation on the dividend and the divisor which are ciphertext.

For example, the second variable is obtained by increasing the number of significant bits of the divisor, where the number of significant bits of the second variable is greater than or equal to the number of significant bits of the first variable, an implementation is possible through the following manner specifically.

According to a maximum number of significant bits of the dividend, shift the divisor to the left by the maximum number of significant bits of the dividend, to obtain the second variable. In this way, the alignment between the dividend and divisor can be realized without determining the number of significant bits of the dividend and divisor. If a difference between the number significant bits of the dividend and that of the divisor is known, shift the divisor to the left by the difference to make the number of significant bits of the divisor not less than that of the dividend.

In the embodiment, a shift operation performed on data is a shift operation based on secure multi-party computing, which can be specifically implemented using a Boolean Circuit or a Garbled Circuit.

In addition, a quotient of the dividend and divisor can be initialized to 0. In the embodiment, the dividend, divisor and quotient are all represented in binary.

After the dividend and divisor are aligned, according to the first variable corresponding to the dividend and the second variable corresponding to the divisor, perform the processing of the following steps S402-S404 iteratively. In a single iteration process, a value of one bit of the quotient is determined and added to the end of the quotient. The number of iterations is determined according to a length of significant bits for the quotient. In this way, the long division based on secure multi-party computing can be realized for the dividend and divisor which are ciphertext, thereby generation of data overflow in a division operation based on secure multi-party computing can be avoided effectively.

Step S402, comparing whether the first variable is greater than or equal to the second variable.

In the embodiment, a comparing operation for comparing two data values is a comparing operation based on secure multi-party computing, which can be implemented using a Boolean Circuit or a Garbled Circuit.

Step S403, determining a value of a current bit of a quotient and updating the first variable and the second variable according to a compare result.

In the step, determining the value of the current bit of the quotient and updating the first variable and the second variable according to the compare result require specifically implementations of: when the first variable is greater than or equal to the second variable, adding 1 to the end of the quotient, subtracting the second variable from the first variable and shifting the second variable to the right by one bit; and when the first variable is smaller than the second variable, adding 0 to the end of the quotient, shifting the first variable to the left by one bit, and remaining the second variable unchangeable.

In the embodiment, determining the value of the current bit of the quotient according to the compare result may be implemented through the following manner:

adding 1 or 0 to the end of the quotient according to the compare result, where 1 is added to the end of the quotient when the first variable is greater than or equal to the second variable, and 0 is added to the end of the quotient when the first variable is smaller than the second variable. Based on secure multi-party computing, 1 or 0 is added to the end of the quotient according to the compare result.

The compare result in the step, which is a compare operation obtained based on secure multi-party computing, is ciphertext, therefore, a compare result of plaintext cannot be learned. Under the circumstance that a compare result of plaintext cannot be learned, it is a technical difficulty to determine the value of the current bit of the quotient and update the first variable and the second variable according to the compare result.

In an implementation, adding 1 or 0 to the end of the quotient according to the compare result may be specifically implemented through the following manner: adding 0 to the end of the quotient; and performing an XOR operation on the quotient with 0 added to the end thereof and the compare result. In this way, based on the compare result of ciphertext, under the circumstance that a compare result of plaintext is unknown, 1 or 0 is added to the end of the quotient directly, and it is also realized that 1 is added to the end of the quotient when the first variable is greater than or equal to the second variable, and 0 is added to the end of the quotient when the first variable is smaller than the second variable.

For example, when the first variable is greater than or equal to the second variable, the compare result is 1 (ciphertext); and when the first variable is smaller than the second variable, the compare result is 0 (ciphertext). By means of adding 0 (ciphertext) to the end of the quotient, performing an XOR operation on the quotient with 0 added to the end thereof and the compare result, when a compare result is currently 1 (ciphertext), an XOR value will be 1, thereby 0 (ciphertext) which is added to the end of the quotient is changed into 1 (ciphertext), namely, it is realized that 1 is added to the end of the quotient when the first variable is greater than or equal to the second variable; when a compare result is currently 0 (ciphertext), an XOR result will be 1, thereby 0 (ciphertext) which is added to the end of the quotient is still 0 (ciphertext), namely, it is realized that 0 is added to the end of the quotient when the first variable is smaller than the second variable.

In an implementation, updating the first variable according to the compare result may be implemented through the following manner:

performing first update processing on the first variable to obtain a first update result, where the first update processing is update processing on the first variable when the first variable is greater than or equal to the second variable; performing second update processing on the first variable to obtain a second update result, where the second update processing is update processing on the first variable when the first variable is smaller than the second variable; calculating a first product of the compare result and the first update result, and a second product of a NOT operation result of the compare result and the second update result; and taking a sum of the first product and the second product as the updated first variable. In this way, based on the compare result of ciphertext, under the circumstance that a compare result of plaintext is unknown, the first variable is updated directly.

The first update processing is update processing on the first variable when the first variable is greater than or equal to the second variable. The first update processing is specifically: through a subtraction operation based on secure multi-party computing, subtracting the second variable from the first variable to obtain the first update result.

The second update processing is update processing on the first variable when the first variable is smaller than the second variable. The second update processing is specifically: through a shift operation based on secure multi-party computing, shifting the first variable to the left by one bit to obtain the second update result.

For example, when the first variable is greater than or equal to the second variable, the compare result is 1 (ciphertext), and a NOT operation result of the compare result is 0 (ciphertext); when the first variable is smaller than the second variable, the compare result is 0 (ciphertext), and a NOT operation result of the compare result is 1 (ciphertext). By means of calculating a first product of the compare result and the first update result, and a second product of a NOT operation result of the compare result and the second update result: when the first variable is greater than or equal to the second variable, the first product will be equal to the first update result and the second product will be 0 (ciphertext), by means of calculating the sum the first product and the second product, it is determined that the updated first variable will be equal to the first update result; when the first variable is smaller than the second variable, the first product will be 0 (ciphertext) and the second product will be equal to the second update result, by means of calculating the sum the first product and the second product, the updated first variable may be determined to be the second update result.

In an implementation, updating the second variable according to the compare result may be implemented through the following manner:

performing third update processing on the second variable to obtain a third update result, where the third update processing is update processing on the second variable when the first variable is greater than or equal to the second variable; calculating a third product of the compare result and the third update result, and a fourth product of a NOT operation result of the compare result and the second variable; and taking a sum of the third product and the fourth product as the updated second variable. In this way, based on the compare result of ciphertext, under the circumstance that a compare result of plaintext is unknown, the second variable is updated directly.

The third update processing is update processing on the second variable when the first variable is greater than or equal to the second variable. The third update processing is specifically: through a shift operation based on secure multi-party computing, shifting the second variable to the right by one bit to obtain the third update result. When the first variable is smaller than the second variable, the second variable remains unchangeable.

For example, when the first variable is greater than or equal to the second variable, the compare result is 1 (ciphertext), and a NOT operation result of the compare result is 0 (ciphertext); when the first variable is smaller than the second variable, the compare result is 0 (ciphertext), and a NOT operation result of the compare result is 1 (ciphertext). By means of calculating a third product of the compare result and the third update result, and a fourth product of a NOT operation result of the compare result and the second variable: when the first variable is greater than or equal to the second variable, the first product will be equal to the third update result and the second product will be 0 (ciphertext), by means of calculating the sum the third product and the fourth product, it is determined the updated second variable will be equal to the third update result; when the first variable is smaller than the second variable, the third product will be 0 (ciphertext) and the fourth product will be equal to the second variable, by means of calculating the sum the third product and the fourth product, the updated second variable may be determined to be still the second variable, which remains unchangeable.

Step S404, whether a number of bits of the quotient is equal to a preset length of significant bits.

On completing the processing with regard to each iteration, determine whether a number of bits determined by the iteration for the currently obtained quotient is equal to a preset length of significant bits for a quotient.

When the number of bits of the quotient is not equal to the preset length of significant bits, proceed with the step S402 to perform processing with regard to a next iteration according to the updated first variable and second variable.

When the number of bits of the quotient is equal to the preset length of significant bits, the currently obtained quotient is the quotient of the dividend and divisor, proceed with the step S405.

Step S405, taking a currently obtained quotient as the quotient of the dividend and divisor.

For example, in the foregoing step S303 where the respective classification prediction value is divided by the maximum value of all the classification prediction values, it is possible to calculate, with the respective classification prediction value as the dividend and the maximum value as the divisor, the quotient of the respective classification prediction value and the maximum value using the method as shown in FIG. 4.

For example, using any one of the classification prediction values as the dividend, and the maximum value of the classification prediction values as the divisor, if it is satisfied that the number of significant bits of the divisor is greater than or equal to the number of significant bits of the dividend, it is not necessary to perform alignment between the dividend and divisor. According to the first variable corresponding to the dividend and the second variable corresponding to the divisor, perform the processing of the foregoing steps S402-S404 iteratively, where in a single iteration process, a value of one bit of the quotient is determined and added to the end of the quotient; until the number of iterations is greater than or equal to the length of significant bits for the quotient to arrive at the quotient of the classification prediction value and the maximum value.

In this way, the long division operation based on the secure multi-party computing can be realized for the classification prediction values and the maximum value thereof which are ciphertext, thereby generation of data overflow in a division operation based on secure multi-party computing can be avoided effectively.

In the embodiments of the present disclosure, calculation of the quotient of a respective classification prediction value and the maximum value is implemented through the long division based on secure multi-party computing using a Boolean Circuit or Garbled Circuit, no data overflow will be incurred and the precision is high.

Figure 6:
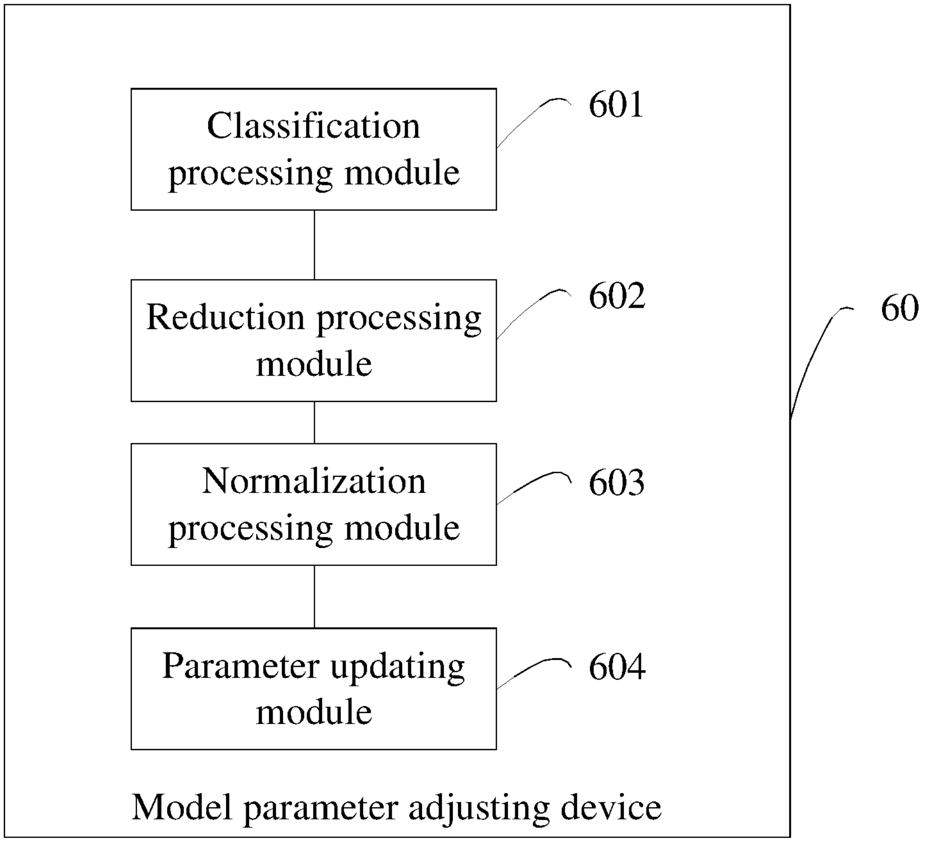
FIG. 6 is a schematic diagram of a model parameter adjusting device according to a third embodiment of the present disclosure.

FIG. 6 is a schematic diagram of a model parameter adjusting device according to a third embodiment of the present disclosure. The model parameter adjusting device according to the embodiment of the present disclosure can carry out the processing flows provided according to the embodiments of the model parameter adjusting method. As shown in FIG. 6, the model parameter adjusting device 60 includes: a classification processing module 601, a reduction processing module 602, a normalization processing module 603 and a parameter updating module 604.

Specifically, the classification processing module 601 is configured to perform classification processing on input data by using a classification model obtained through training based on secure multi-party computing, to obtain classification prediction values of the classification model.

The reduction processing module 602 is configured to perform reduction processing on the classification prediction values.

The normalization processing module 603 is configured to perform normalization processing on the classification prediction values subjected to the reduction processing to obtain a normalization result of the classification prediction values.

The parameter updating module 604 is configured to update a parameter of the classification model according to the normalization result of the classification prediction values.

The device according to the embodiment of the application can be specifically configured to perform the method embodiment according to the first embodiment, and the specific functions will not be described herein.

According to the embodiment of the present disclosure, in a process of model parameter adjustment based on secure multi-party computing, perform classification processing on input data by using a classification model obtained through training based on secure multi-party computing to obtain classification prediction values of the classification model; perform reduction processing on the classification prediction values; perform normalization processing on the classification prediction values subjected to the reduction processing to obtain a normalization result of the classification prediction values; and update a parameter of the classification model according to the normalization result of the classification prediction values. By means of performing the reduction processing on the classification prediction values to reduce input values of a normalization method, generation of data overflow can be avoided in a normalization process, thus the training precision of the classification model can be improved.

Figure 7:
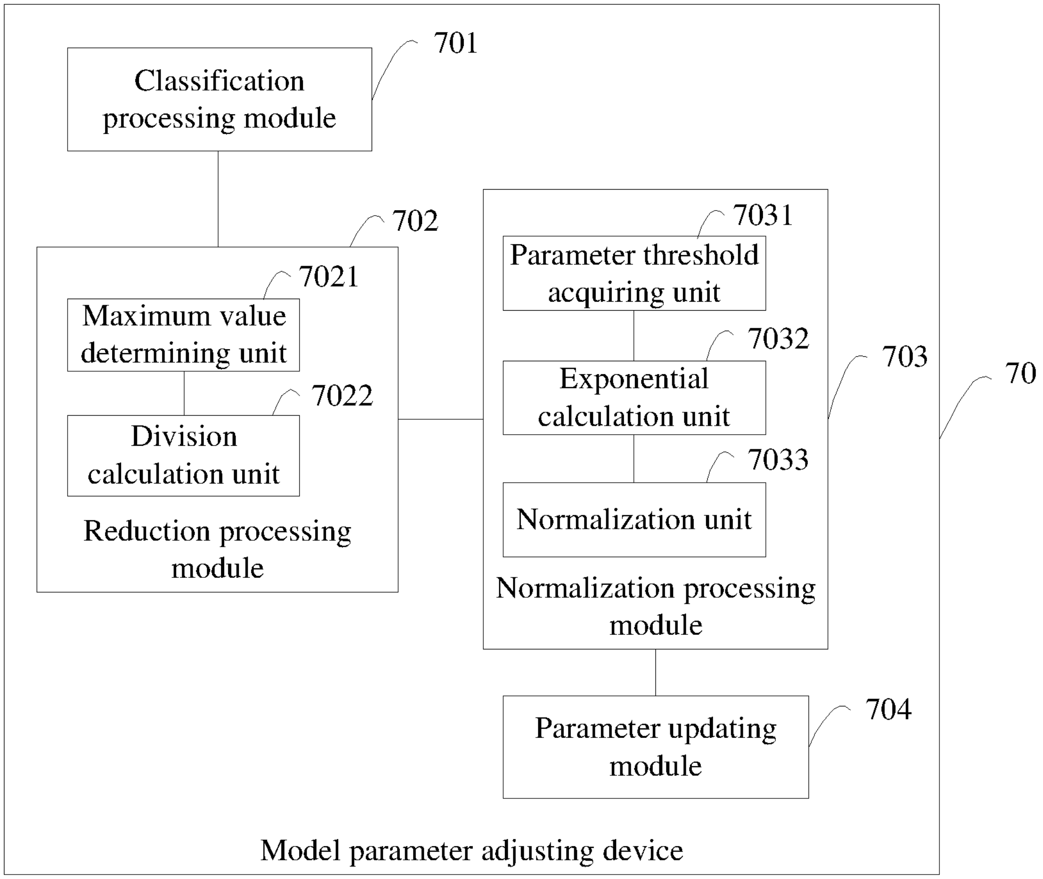
FIG. 7 is a schematic diagram of a model parameter adjusting device according to a fourth embodiment of the present disclosure.

FIG. 7 is a schematic diagram of a model parameter adjusting device according to a fourth embodiment of the present disclosure. On the basis of the foregoing third embodiment, in this embodiment, as shown in FIG. 7, the model parameter adjusting device 70 includes: a classification processing module 701, a reduction processing module 702, a normalization processing module 703 and a parameter updating module 704.

Specifically, the classification processing module 701 is configured to perform classification processing on input data by using a classification model obtained through training based on secure multi-party computing, to obtain classification prediction values of the classification model.

The reduction processing module 702 is configured to perform reduction processing on the classification prediction values.

The normalization processing module 703 is configured to perform normalization processing on the classification prediction values subjected to the reduction processing to obtain a normalization result of the classification prediction values.

The parameter updating module 704 is configured to update a parameter of the classification model according to the normalization result of the classification prediction values.

In an implementation, the reduction processing module 702 includes:

a maximum value determining unit 7021, configured to determine a maximum value in the classification prediction values; and a division calculation unit 7022, configured to divide a respective classification prediction value by the maximum value.

In an implementation, the division calculation unit 7022 includes:

an alignment sub-unit, configured to take the respective classification prediction value and the maximum value as a first variable and a second variable, respectively, where a number of significant bits of the second variable is greater than or equal to a number of significant bits of the first variable;

an iteration sub-unit, configured to:

compare whether the first variable is greater than or equal to the second variable; determine a value of a current bit of a quotient and update the first variable and the second variable according to a compare result; and compare the updated first variable and second variable, and determine a value of a following bit of the quotient according to a compare result until the number of bits of the quotient reaches a preset length of significant bits, where the obtained quotient is a result of dividing the respective classification prediction value by the maximum value.

In an implementation, the iteration sub-unit is further configured to:

add 1 or 0 to the end of the quotient according to the compare result, where 1 is added to the end of the quotient when the first variable is greater than or equal to the second variable, and 0 is added to the end of the quotient when the first variable is smaller than the second variable.

In an implementation, the iteration sub-unit is further configured to:

add 0 to the end of the quotient; and perform an XOR operation on the quotient with 0 added to the end thereof and the compare result.

In an implementation, the iteration sub-unit is further configured to:

perform first update processing on the first variable to obtain a first update result, where the first update processing is update processing on the first variable when the first variable is greater than or equal to the second variable; perform second update processing on the first variable to obtain a second update result, where the second update processing is update processing on the first variable when the first variable is smaller than the second variable; calculate a first product of the compare result and the first update result, and a second product of a NOT operation result of the compare result and the second update result; and take a sum of the first product and the second product as the updated first variable.

In an implementation, the iteration sub-unit is further configured to:

perform third update processing on the second variable to obtain a third update result, where the third update processing is update processing on the second variable when the first variable is greater than or equal to the second variable; calculate a third product of the compare result and the third update result, and a fourth product of a NOT operation result of the compare result and the second variable; and take a sum of the third product and the fourth product as the updated second variable.

In an implementation, the normalization processing module 703 includes:

a parameter threshold acquiring unit 7031, configured to acquire a parameter threshold;

an exponential calculation unit 7032, configured to set a value of a function parameter n in an exponential function to be the parameter threshold and calculate an exponential function value of a respective classification prediction value subjected to the reduction processing; and a normalization unit 7033, configured to determine, according to the respective exponential function value and a sum of all exponential function values, the normalization result of the respective classification prediction value subjected to the reduction processing.

In an implementation, the exponential calculation unit 7032 is further configured to:

for the respective classification prediction value subjected to the reduction processing, calculate the exponential function value of the classification prediction value subjected to the reduction processing, through the following Equation:

$$e^x = \left(1 + x \times \frac{1}{M}\right)^M$$

where e is a natural constant, x is the classification prediction value subjected to the reduction processing, $e^x$ is the exponential function value of the classification prediction value subjected to the reduction processing, M is the parameter threshold, $$\frac{1}{M}$$

is the reciprocal or me parameter threshold, and M is a constant.

The device according to the embodiment of the present disclosure can be specifically configured to perform the method embodiment according to the second embodiment, and the specific functions will not be described herein.

In the embodiment, based on the definition of the exponential function, the value of the function parameter n in the exponential function is set to be the parameter threshold, such that an exponential operation is converted into multiplication operations; an approximate exponential operation is realized by means of multiplication operations based on secure multi-party computing, producing a very small error under a relatively large parameter threshold and incurring no data overflow. Further, calculation of the quotient of a respective classification prediction value and the maximum value is implemented through the long division based on secure multi-party computing using a Boolean Circuit or Garbled Circuit, no data overflow will be incurred and the precision is high.

According to embodiments of the present disclosure, the present disclosure further provides an electronic device and a readable storage medium.

According to an embodiment of the present disclosure, the present disclosure further provides a computer program product, including: a computer program, where the computer program is stored in a readable storage medium from which the computer program is readable by at least one processor of an electronic device, and the solution according to any one of the forgoing embodiments is implemented by the electronic device when the computer program is executed by the at least one processor.

Figure 8:
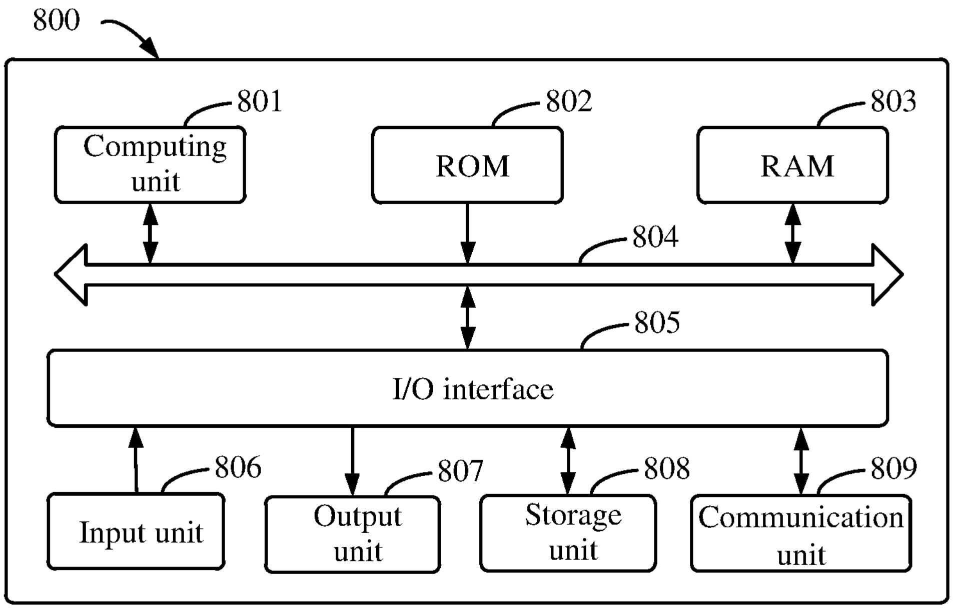
FIG. 8 is a block diagram of an electronic device for implementing a model parameter adjusting method according to an embodiment of the present disclosure.

FIG. 8 shows a schematic block diagram of an exemplary electronic device 800 which may be used for implementing the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital assistant, a cellular phone, a smart phone, a wearable device, and other similar computing devices. The components, and the connections, relationships and functions thereof are merely exemplary and are not intended to limit the implementations of the present disclosure described and/or claimed herein.

As shown in FIG. 8, the electronic device 800 includes a computing unit 801 that is capable of performing various appropriate actions or processes according to a computer program stored in a read only memory (ROM) 802 or a computer program loaded from a storage unit 808 into a random access memory (RAM) 803. In the RAM 803, various programs and data required for operations of the device 800 may also be stored. The computing unit 801, the ROM 802 and the RAM 803 are connected to each other via a bus 804. An input/output (I/O) interface 805 is also connected to the bus 804.

A plurality of components in the device 800 are connected to the I/O interface 805, including: an input unit 806, such as a keyboard, a mouse, etc.; an output unit 807, such as various types of displays, speakers, etc.; the storage unit 808, such as a magnetic disk, an optical disc, etc.; and a communication unit 809, such as a network card, a modem, a wireless communication transceiver, etc. The communication unit 809 allows the device 800 to exchange information/data with other devices through a computer network such as the Internet and/or various telecommunication networks.

The computing unit 801 may be various general-purpose and/or special-purpose processing components with processing and computing capabilities. Some examples of the computing unit 801 include but not limited to, a central processing unit (CPU), a graphics processing unit (GPU), various dedicated artificial intelligence (AI) computing chips, various computing units for running machine learning model algorithms, a digital signal processor (DSP), and any appropriate processor, controller, microcontroller, etc. The computing unit 801 executes various methods and processes described above, such as the model parameter adjusting method. For example, in some embodiments, the model parameter adjusting method may be implemented as a computer software program, which is tangibly contained in a machine-readable medium, such as the storage unit 808. In some embodiments, a portion or an entirety of the computer program may be loaded and/or installed on the device 800 via the ROM 802 and/or the communication unit 809. When the computer program is loaded into the RAM 803 and executed by the computing unit 801, one or more steps of the model parameter adjusting method described above may be implemented. Alternatively, in other embodiments, the computing unit 801 may be configured to perform the model parameter adjusting method by any other appropriate means (for example, by means of firmware).

Various implementations of the systems and technologies described above may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software and/or a combination thereof. These various implementations may include: being implemented in one or more computer programs, where the one or more computer programs may be executed and/or interpreted on a programmable system including at least one programmable processor; the programmable processor may be a special-purpose or general-purpose programmable processor, which may receive data and instructions from a storage system, at least one input device and at least one output device and transmit the data and instructions to the storage system, the at least one input device, and the at least one output device.

Program codes for implementing the method of the present disclosure may be written in one or any combination of multiple programming languages. These program codes may be provided to a processor or a controller of a general-purpose computer, a special-purpose computer or other programmable data processing apparatus, such that when the program codes are executed by the processor or the controller, the functions/operations specified in the flowcharts and/or block diagrams are implemented. The program codes may be executed completely on a machine, partially on the machine, partially on the machine and partially on a remote machine as a separate software package, or completely on the remote machine or a server.

In the context of the present disclosure, the machine-readable medium may be a tangible medium that may contain or store programs to be used by an instruction executing system, apparatus or device, or used in combination with the instruction executing system, apparatus or device. The machine-readable medium may be a machine-readable signal medium or a machine-readable storage medium. The machine-readable medium may include but not limited to an electronic, magnetic, optical, electromagnetic, infrared, or semiconductor system, apparatus or device, or any suitable combination of the above. More specific examples of the machine-readable storage medium may include an electrically connected portable computer disk based on one or more lines, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device or any suitable combination of the above.

In order to provide an interaction with a user, the systems and technologies described herein may be implemented on a computer having: a display device for displaying information to the user (for example, a CRT (cathode ray tube) or LCD (liquid crystal display) monitor); and a keyboard and pointing device (for example, a mouse or a trackball) through which the user may provide input to the computer. Other kinds of devices may also be used to provide an interaction with the user, for example, feedback provided to the user may be any form of sensory feedback (for example, visual feedback, auditory feedback, or tactile feedback); and the input from the user may be received in any form (including an acoustic input, a voice input or a tactile input).

The systems and technologies described herein may be implemented in a computing system that includes a background component (for example, as a data server), or a computing system that includes a middleware component (for example, an application server), or a computing system that includes a front-end component (for example, a user computer having a graphical user interface or a web browser through which a user may interact with the implementations of the systems and technologies described herein), or a computing system that includes any combination of such background component, middleware component, or front-end component. The components of the system may be connected to each other by digital data communication (for example, a communication network) in any form or medium. Examples of the communication network include a local area network (LAN), a wide area network (WAN), and the Internet.

A computing system may include a client and a server. The client and the server are generally far away from each other and typically interact through a communication network. The relationship between the client and the server is generated by running computer programs having a client-server relationship on corresponding computers. The server, which may be a cloud server, also known as a cloud computing server or a cloud host, is a host product in a cloud computing service system to solve the defects of huge management difficulties and weak business scalability that exist in a conventional physical host and a VPS ("virtual private server", or "VPS" for short) service. The server may also be a server of a distributed system, or a server combined with a blockchain.

It should be understood that various forms of processes as shown above may be used to reorder, add or delete a step. For example, the steps recorded in the present disclosure may be executed in parallel, sequentially or in other orders, which, as long as a desired result of the technical solution disclosed in the present disclosure is realized, is not limited herein.

The above specific embodiments do not constitute a limitation to the protection scope of the present disclosure. Those skilled in the art should understand that various modifications, combinations, sub-combinations and substitutions may be made according to design requirements and other considerations. Any modification, equivalent substitution and improvement made within the spirit and principles of the present disclosure shall be included in the protection scope of the present disclosure.

What is claimed is:

1. A computer-implemented model parameter adjusting method, wherein the method is applied in a field of secure multi-party computing, comprising:

performing classification processing on input data by using a classification model obtained through training based on secure multi-party computing, to obtain classification prediction values of the classification model, wherein the input data and the classification prediction values are ciphertext data, and a type of the input data comprises an image, text or voice;

performing reduction processing on the classification prediction values;

performing normalization processing on the classification prediction values subjected to the reduction processing to obtain a normalization result of the classification prediction values; and updating a parameter of the classification model according to the normalization result of the classification prediction values;

wherein the performing the reduction processing on the classification prediction values comprises:

determining a maximum value in the classification prediction values; and dividing a respective classification prediction value by the maximum value.

2. The method according to claim 1, wherein the dividing the respective classification prediction value by the maximum value comprises:

taking the respective classification prediction value and the maximum value as a first variable and a second variable, respectively, wherein a number of significant bits of the second variable is greater than or equal to a number of significant bits of the first variable;

comparing whether the first variable is greater than or equal to the second variable;

determining a value of a current bit of a quotient and updating the first variable and the second variable according to a compare result;

comparing the updated first variable and second variable, and determining a value of a following bit of the quotient according to a compare result until a number of bits of the quotient reaches a preset length of significant bits, wherein the obtained quotient is a result of dividing the respective classification prediction value by the maximum value.

3. The method according to claim 2, wherein the determining the value of the current bit of the quotient according to the compare result comprises:

adding 1 or 0 to the end of the quotient according to the compare result, wherein 1 is added to the end of the quotient when the first variable is greater than or equal to the second variable, and 0 is added to the end of the quotient when the first variable is smaller than the second variable.

4. The method according to claim 3, wherein the adding 1 or 0 to the end of the quotient according to the compare result, wherein 1 is added to the end of the quotient when the first variable is greater than or equal to the second variable, and 0 is added to the end of the quotient when the first variable is smaller than the second variable, comprises:

adding 0 to the end of the quotient; and performing an XOR operation on the quotient with 0 added to the end thereof and the compare result.

5. The method according to claim 4, wherein updating the first variable according to the compare result comprises:

performing first update processing on the first variable to obtain a first update result, wherein the first update processing is update processing on the first variable when the first variable is greater than or equal to the second variable;

performing second update processing on the first variable to obtain a second update result, wherein the second update processing is update processing on the first variable when the first variable is smaller than the second variable;

calculating a first product of the compare result and the first update result, and a second product of a NOT operation result of the compare result and the second update result; and taking a sum of the first product and the second product as the updated first variable.

6. The method according to claim 4, wherein the updating the second variable according to the compare result comprises:

performing third update processing on the second variable to obtain a third update result, wherein the third update processing is update processing on the second variable when the first variable is greater than or equal to the second variable;

calculating a third product of the compare result and the third update result, and a fourth product of a NOT operation result of the compare result and the second variable; and taking a sum of the third product and the fourth product as the updated second variable.

7. The method according to claim 3, wherein updating the first variable according to the compare result comprises:

performing first update processing on the first variable to obtain a first update result, wherein the first update processing is update processing on the first variable when the first variable is greater than or equal to the second variable;

performing second update processing on the first variable to obtain a second update result, wherein the second update processing is update processing on the first variable when the first variable is smaller than the second variable;

calculating a first product of the compare result and the first update result, and a second product of a NOT operation result of the compare result and the second update result; and taking a sum of the first product and the second product as the updated first variable.

8. The method according to claim 3, wherein the updating the second variable according to the compare result comprises:

performing third update processing on the second variable to obtain a third update result, wherein the third update processing is update processing on the second variable when the first variable is greater than or equal to the second variable;

calculating a third product of the compare result and the third update result, and a fourth product of a NOT operation result of the compare result and the second variable; and taking a sum of the third product and the fourth product as the updated second variable.

9. The method according to claim 3, wherein the updating the parameter of the classification model according to the normalization result of the classification prediction values comprises:

determining a classification result of the classification model according to the normalization result of the classification prediction values; and updating the parameter of the classification model according to the classification result.

10. The method according to claim 2, wherein updating the first variable according to the compare result comprises:

performing first update processing on the first variable to obtain a first update result, wherein the first update processing is update processing on the first variable when the first variable is greater than or equal to the second variable;

performing second update processing on the first variable to obtain a second update result, wherein the second update processing is update processing on the first variable when the first variable is smaller than the second variable;

calculating a first product of the compare result and the first update result, and a second product of a NOT operation result of the compare result and the second update result; and taking a sum of the first product and the second product as the updated first variable.

11. The method according to claim 10, wherein the updating the second variable according to the compare result comprises:

performing third update processing on the second variable to obtain a third update result, wherein the third update processing is update processing on the second variable when the first variable is greater than or equal to the second variable;

calculating a third product of the compare result and the third update result, and a fourth product of a NOT operation result of the compare result and the second variable; and taking a sum of the third product and the fourth product as the updated second variable.

12. The method according to claim 2, wherein the updating the second variable according to the compare result comprises:

performing third update processing on the second variable to obtain a third update result, wherein the third update processing is update processing on the second variable when the first variable is greater than or equal to the second variable;

calculating a third product of the compare result and the third update result, and a fourth product of a NOT operation result of the compare result and the second variable; and taking a sum of the third product and the fourth product as the updated second variable.

13. The method according to claim 2, wherein the updating the parameter of the classification model according to the normalization result of the classification prediction values comprises:

determining a classification result of the classification model according to the normalization result of the classification prediction values; and updating the parameter of the classification model according to the classification result.

14. The method according to claim 2, wherein the step of comparing whether the first variable is greater than or equal to the second variable is implemented by a Boolean circuit or a Garbled circuit.

15. The method according to claim 1, wherein the performing the normalization processing on the classification prediction values subjected to the reduction processing to obtain the normalization result of the classification prediction values comprises:

acquiring a parameter threshold;

setting a value of a function parameter n in an exponential function to be the parameter threshold and calculating an exponential function value of a respective classification prediction value subjected to the reduction processing; and determining, according to the respective exponential function value and a sum of all exponential function values, the normalization result of the respective classification prediction value subjected to the reduction processing.

16. The method according to claim 15, wherein the setting the value of the function parameter n in the exponential function to be the parameter threshold and the calculating the exponential function value of the respective classification prediction value subjected to the reduction processing comprise:

for the respective classification prediction value subjected to the reduction processing, calculating the exponential function value of the classification prediction value subjected to the reduction processing, through the following equation:

$$e^x = \left(1 + x \times \frac{1}{M}\right)^M$$

wherein e is a natural constant, x is the classification prediction value subjected to the reduction processing, $e^x$ is the exponential function value of the classification prediction value subjected to the reduction processing, M is the parameter threshold, $$\frac{1}{M}$$

is the reciprocal of the parameter threshold, and M is a constant.

17. The method according to claim 1, wherein the updating the parameter of the classification model according to the normalization result of the classification prediction values comprises:

determining a classification result of the classification model according to the normalization result of the classification prediction values; and updating the parameter of the classification model according to the classification result.

18. The method according to claim 1, wherein the updating the parameter of the classification model according to the normalization result of the classification prediction values comprises:

determining a classification result of the classification model according to the normalization result of the classification prediction values; and updating the parameter of the classification model according to the classification result.

19. An electronic device applied in a field of secure multi-party computing, comprising:

at least one processor, and a memory communicatively connected with the at least one processor;

wherein the memory has stored thereon instructions executable by the at least one processor, and the instructions, when executed by the at least one processor, enable the at least one processor to implement the steps of:

performing classification processing on input data by using a classification model obtained through training based on secure multi-party computing, to obtain classification prediction values of the classification model, wherein the input data and the classification prediction values are ciphertext data, and a type of the input data comprises an image, text or voice;

performing reduction processing on the classification prediction values;

performing normalization processing on the classification prediction values subjected to the reduction processing to obtain a normalization result of the classification prediction values; and updating a parameter of the classification model according to the normalization result of the classification prediction values;

wherein the instructions, when executed by the at least one processor, enable the at least one processor to further implement steps of:

determining a maximum value in the classification prediction values; and dividing a respective classification prediction value by the maximum value.

20. A non-transitory computer-readable storage medium, on which computer instructions are stored, wherein the computer instructions are configured to enable a computer applied in a field of secure multi-party computing to execute the steps of:

performing classification processing on input data by using a classification model obtained through training based on secure multi-party computing, to obtain classification prediction values of the classification model, wherein the input data and the classification prediction values are ciphertext data, and a type of the input data comprises an image, text or voice;

performing reduction processing on the classification prediction values;

performing normalization processing on the classification prediction values subjected to the reduction processing to obtain a normalization result of the classification prediction values; and updating a parameter of the classification model according to the normalization result of the classification prediction values;

wherein the computer instructions are configured to enable the computer to further execute steps of:

determining a maximum value in the classification prediction values; and dividing a respective classification prediction value by the maximum value.

* * * * *